June 14, 1927.
R. C. HAWKINS
1,632,070
DRAWBAR ATTACHMENT FOR TRACTORS
Filed Feb. 24, 1926
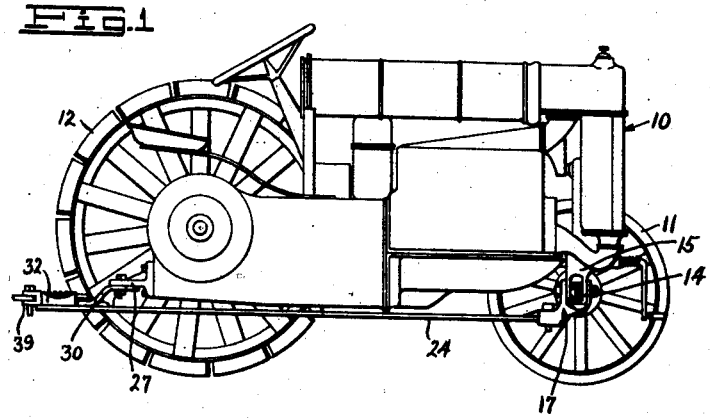
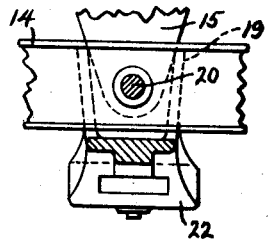
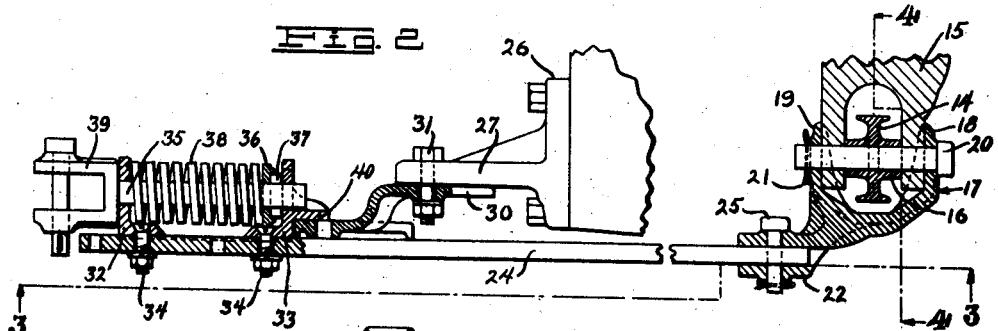
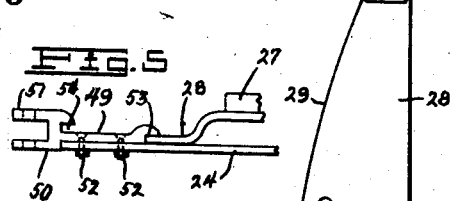
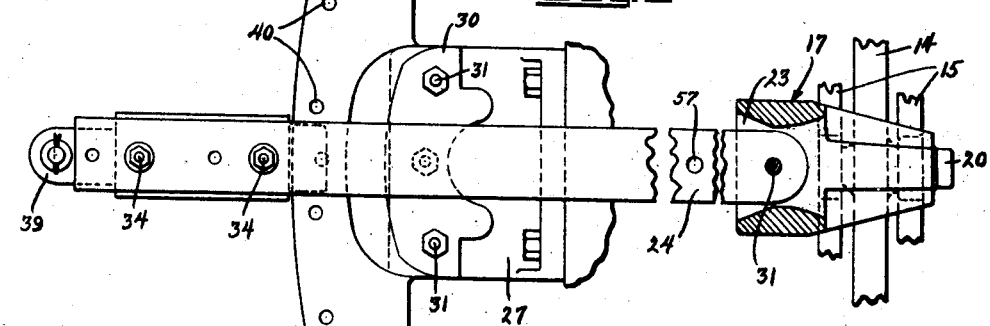
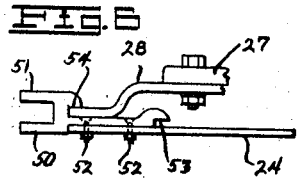
INVENTOR.
ROE C. HAWKINS
BY
ATTORNEY Patented June 14, 1927.

1,632,070

UNITED STATES PATENT OFFICE.

ROE C. HAWKINS, OF LONG BEACH, CALIFORNIA, ASSIGNOR TO "H H" MANUFACTURERS, INC., OF LONG BEACH, CALIFORNIA, A CORPORATION OF CALIFORNIA.

DRAWBAR ATTACHMENT FOR TRACTORS.

Application filed February 24, 1926. Serial No. 90,233.

This invention relates to drawbars for tractors.

The general object of the invention is to provide an improved drawbar which may be attached to tractors for the purpose of preventing the front end of the tractor from raising when pulling heavy loads.

Another object of the invention is to provide an improved device for attaching a drawbar to the front end of a tractor.

A further object of my invention is to provide a drawbar which may be arranged at an angle to the longitudinal axis of the tractor.

Another object of the invention is to provide an improved drawbar support on the rear end of a tractor.

An additional object of the invention is to provide a drawbar support including a platform wherein the drawbar is supported from the top of the platform to thus give greater clearance.

Other objects of the invention will be apparent from the following description taken in connection with the accompanying drawings, wherein:

Fig. 1 is a side elevation of a tractor with the wheels on one side removed;

Fig. 2 is a fragmentary sectional view showing the details of the drawbar attachments;

Fig. 3 is a section on line 3—3, Fig. 2;

Fig. 4 is a section on line 4—4, Fig. 2;

Fig. 5 is a side elevation showing a slightly modified form of my invention;

Fig. 6 is a view similar to Fig. 5 showing the modification attached in another position, and Fig. 7 is a section of the front yoke showing in dotted lines another position of the drawbar.

Referring to the drawing by reference characters, I have shown a tractor generally at 10. This tractor may be of any desired construction and may be provided with front wheels 11 and rear wheels 12.

In tractors of the type to which my invention is particularly adaptable it has been a source of much inconvenience that when a load is pulled by the tractor the latter will frequently rear up and fall over backwards. To overcome this difficulty, I arrange my drawbar in such a manner that the pulling effect is secured from the front end of the tractor. The front axle is shown at 14 in Fig. 2. This axle supports the frame 15 which in turn supports the front portion of the tractor.

The axle is provided with an aperture 16 as shown. About the lower portion of the body 15 I arrange an upwardly directed yoke member 17 which has a front portion 18 and a rear portion 19 arranged upon the front and back portions of the body 15 and these portions have apertures aligning with the aperture 16 previously mentioned.

Through all of the aligned apertures I arrange a pivot pin or bolt 20 which is shown as provided with a cotter pin in one end although other fastening means may be provided if desired.

The yoke 17 is provided with a rearwardly facing extension 22 which is slotted as at 23 (see Fig. 3) and within this slot I fit the end of a drawbar 24. This drawbar is provided with an aperture which fits a substantially vertical pin 25 which passes through the portion 22 of the yoke. This arrangement provides a swinging action for the drawbar 24 as will be readily apparent.

The rear of the tractor is shown as provided with a bracket 26 which includes a horizontally extending portion 27. Mounted upon the under surface of this horizontally extending portion 27 I show a one-piece platform 28. This platform is provided with an arcuate front edge 29 and with a rearwardly extending portion 30 which engages the under portion of the bracket 27. The platform 28 may be secured to the bracket by means of bolts or other fastening means 31.

The drawbar is mounted to swing beneath the platform 28 and the drawbar is provided near its rear end with a spring housing member which includes front and rear portions 32 and 33 which are shown as held in position by means of bolts 34. The spring housing portions 32 and 33 are apertured to receive a bar 35 which has a washer 36 at one end thereof secured by a pin 37. A spring 38 surrounds the bar 35.

The rear end of the bar 35 is provided with a pull member 39 which may be integral with the bar or may be secured thereto in any desired manner. The portion 33 of the spring housing includes a lip portion 40 which engages the upper surface of the platform 28 and thus restrains downward movement of the drawbar 24. The construction is such that when the article to be pulled is secured to the pull member and the tractor is advanced the spring 38 will first be compressed to thereby take off any shock due to the start. After the spring is compressed the drawbar will be placed in tension with the front of the frame and thus overcome any tendency of the tractor to rear backwardly.

It is frequently desirable that the drawbar 28 be arranged at an angle relative to the longitudinal axis of the tractor and when this is desirable the drawbar 24 may be swung to the desired angle after which pins may be inserted in one or more apertures 40 in the platform 28 to hold the drawbar at the proper angular position.

In Figs. 5 and 6, I show a side elevation of a slight modification of my invention. In this modification, the bracket 27 and the platform 28 may be similar in all respects to the bracket and platform previously described. In Fig. 5 the pull member is shown at 49. This pull member includes the body 50 having a portion 51 thereon. The pull member 49 is attached to the drawbar 24 by means of bolts or rivets 52.

The pull member 49 is provided with a rabbeted portion 53 near one end thereof and the end of the platform 28 is adapted to fit within this rabbeted portion 53 so that the rear end of the drawbar will be supported as will be readily understood.

When the drawbar is assembled in the position shown in Fig. 5 the inner end of the drawbar will take the position shown in full lines in Fig. 7 so that the drawbar will be supported by and may turn around the pin 31.

In using many types of implements and tools with a tractor, it frequently happens that on account of the location of operating parts or for other reasons, it is necessary that the implement being pulled be arranged somewhat closer to the seat of the tractor. When this arrangement is desirable the drawbar will be moved to the position shown in Fig. 5 and the platform 28 will be arranged in the position shown in Fig. 6 with the end of the platform engaging in the rabbet 54 as shown in Fig. 6.

When in this position the aperture 57 in the drawbar will be engaged by the pin 31 and in this position the drawbar will project to the dotted line position shown in Fig. 7. In order that the drawbar may swing laterally when in this position, I show the recess 23 as tapering inwardly from both sides so that the drawbar may thus swing about the pivot 31 either to one side or the other as desired. In the use of the modification, in Figs. 5, 6, and 7, the drawbar 24 may be swung about the platform 28 to any angular position desired and may be secured in that position by means of pins inserted in apertures 40 as will be readily understood.

From the foregoing description it will be apparent that I have provided a drawbar attachment for tractors which can be economically manufactured and readily installed and which is highly efficient in use.

Having thus described my invention, I claim:

1. In a tractor including a frame having a front axle thereon, said frame including a portion disposed about said axle, a rear bracket on said frame, a drawbar, means to secure said drawbar to said frame, said means engaging said portion of the frame which is disposed about the axle, the draft on said drawbar being transmitted to said means both in pulling and pushing, a platform arranged below and in the rear of said bracket and means on said drawbar engaging said platform to prevent downward movement of said drawbar, said drawbar having a pull member thereon.

2. A tractor comprising a frame including a front portion and a front axle, a pivot pin passing through said axle, a supporting member engaging said pivot pin, a rigid drawbar projecting rearwardly from said supporting member, a pull member mounted on said rigid drawbar and pivot means to connect said drawbar to said supporting member, said pivot means having a substantially vertical axis, the draft on said drawbar being transmitted to said supporting member both in pulling and pushing.

3. A tractor having a front axle thereon, a body supporting frame engaging said axle, means to pivot said frame on said axle, a drawbar, a member for connecting said frame and said drawbar, said pivot means engaging said member and other pivot means engaging the member and drawbar, said last means being positioned adjacent to said axle, the draft on said drawbar being transmitted to said bracket both in pulling and pushing.

4. In combination with a tractor having a front axle and a front axle bracket, a drawbar and means for attaching said drawbar to the front axle bracket, said means comprising a member engaging said bracket, said drawbar being pivoted to said member, the draft on said drawbar being transmitted to said bracket both in pulling and pushing.

5. A tractor having a front axle thereon, a supporting frame engaging said axle, a yoke including two spaced arms arranged in the front and in the rear of said frame, means to secure said yoke to the frame, said yoke including a rearwardly projecting portion, and a drawbar pivotally mounted on said rearwardly projecting portion.

6. A tractor having a front frame portion, a front axle and a front axle bracket, a drawbar pivotally mounted on said front axle bracket to directly receive pushing and pulling impulses therefrom, the rear portion of said tractor having a bracket therein, a platform secured to the said bracket, said platform including a rearwardly projecting portion having an upper and a lower face, said drawbar being mounted to move beneath said platform and close thereto, and means on the drawbar for engaging the upper face of the platform.

7. A tractor having a frame including a front portion, a drawbar pivotally mounted on said front portion, a spring housing having a pair of spring holding members secured near the free end of said drawbar, a pin passing through said spring holding members, a pull member secured upon one end of said pin, a spring surrounding said pin and engaging one of said spring holding members, said spring also engaging a washer on said pin and means to prevent movement of the washer in one direction.

8. A tractor having a front axle thereon, a supporting frame engaging said axle, a yoke including two arms engaging the front and the rear of said frame, a securing pin passing through the arms of said yoke, the frame, and the axle, said yoke including a depending rearwardly projecting portion, said rearwardly projecting portion having a slot therein and a drawbar pivotally mounted in said slot.

9. In a device of the class described, a drawbar, means on said drawbar for attaching it to the front portion of a tractor, a platform, means on said drawbar for engaging said platform to prevent downward movement of said drawbar, a pull member having a pin thereon mounted on said drawbar, spring engaging members on said drawbar, a spring associated with said members, said pin coacting with said spring to hold the pin in one position.

10. A tractor having a frame and a front axle thereon, a drawbar mounted upon said frame near said axle, the rear portion of said tractor having a platform secured thereto, said drawbar projecting beneath said platform, a spring housing member secured near the end of said drawbar, said housing member including two portions, one of said portions having a lip projecting over said platform.

11. A tractor having a front axle thereon, a supporting frame engaging said axle, a yoke including spaced arms arranged upon the front and the rear of said frame, securing means passing through the arms and the frame, said yoke including a rearwardly projecting portion, said rearwardly projecting portion having a slot therein and a drawbar pivotally mounted in said slot, the rear portion of said tractor having a bracket therein, a platform secured to the under portion of said bracket, said platform including a rearwardly projecting portion having a plane upper face and a plane lower face, said drawbar projecting beneath said platform and having means thereon engaging the top of the platform.

12. A tractor having a front axle thereon, a supporting frame engaging said axle, a yoke including two arms engaging the front portion and the rear portion of said frame, a securing pin passing through the arms, the frame, and the axle, said yoke including a depending rearwardly projecting portion, said rearwardly projecting portion having a slot therein and a drawbar pivotally mounted in said slot, the rear portion of said tractor having a bracket therein, a platform secured to the under portion of said bracket, said platform including a rearwardly projecting portion having a plane upper face and a plane lower face, said drawbar projecting beneath said platform, a pair of spring housing members secured near the end of said drawbar, one of said housing members including a lip projecting over said platform, a pin passing through each of said spring housing members, a clevis upon one end of said last mentioned pin, a spring surrounding said pin and engaging one of said spring housing members, a washer on said last mentioned pin, said spring also engaging said washer, and means to prevent movement of the washer in one direction.

In testimony whereof, I hereunto affix my signature.

ROE C. HAWKINS.